United States Patent
Kazmi et al.

(10) Patent No.: US 9,237,473 B2
(45) Date of Patent: Jan. 12, 2016

(54) INTER-FREQUENCY POSITIONING MEASUREMENTS

(75) Inventors: Muhammad Kazmi, Bromma (SE); Iana Siomina, Solna (SE)

(73) Assignee: LENOVO GROUP LIMITED, Quarry Bay (HK)

( * ) Notice: Subject to any disclaimer, the term of this patent is extended or adjusted under 35 U.S.C. 154(b) by 503 days.

(21) Appl. No.: 13/577,791

(22) PCT Filed: Jun. 28, 2010

(86) PCT No.: PCT/SE2010/050735
§ 371 (c)(1),
(2), (4) Date: Aug. 8, 2012

(87) PCT Pub. No.: WO2011/102769
PCT Pub. Date: Aug. 25, 2011

(65) Prior Publication Data
US 2012/0307670 A1    Dec. 6, 2012

Related U.S. Application Data

(60) Provisional application No. 61/306,194, filed on Feb. 19, 2010.

(51) Int. Cl.
*H04W 24/00* (2009.01)
*H04W 24/10* (2009.01)
*H04W 64/00* (2009.01)

(52) U.S. Cl.
CPC .............. *H04W 24/10* (2013.01); *H04W 64/00* (2013.01)

(58) Field of Classification Search
USPC ........................................................ 370/252
See application file for complete search history.

(56) References Cited

U.S. PATENT DOCUMENTS 6,810,019 B2    10/2004    Steudle
7,133,382 B2    11/2006    Steudle (Continued)

FOREIGN PATENT DOCUMENTS

CN    101489238 A    7/2009
CN    101594336 A    12/2009

(Continued)

OTHER PUBLICATIONS

3GPP TS 36.211 version 9.0.0 Release 9 (Dec. 2009).*

(Continued)

*Primary Examiner* — Omar Ghowrwal
*Assistant Examiner* — Ellen A Kirillova

(57) ABSTRACT

A networks node generates an inter-frequency neighbor list of neighbor cells intended to be measured including neighbor cells satisfying an alignment condition and a sufficient measurement time. The alignment condition is satisfied when subframes of a first signal having a first frequency transmitted via a reference cell associated with the user equipment are synchronized with, have a known offset relative to or have a random offset smaller than one half of a sub frame relative to corresponding subframes of a second signal having a second frequency transmitted via a neighboring cells. The sufficient measurement time is determined by an overlap of measurement gaps and positioning subframes in the second signal. The user equipment performs the inter-frequency Reference Signal Time Difference (RSTD) measurements during measurement gaps.

33 Claims, 10 Drawing Sheets

(56) References Cited

U.S. PATENT DOCUMENTS

| | | | |
|---|---|---|---|
| 2002/0122396 A1* | 9/2002 | Terasawa | 370/331 |
| 2007/0097888 A1* | 5/2007 | Moulsley | 370/280 |
| 2008/0189970 A1* | 8/2008 | Wang et al. | 33/701 |
| 2009/0038359 A1 | 2/2009 | Yamakawa et al. | |
| 2010/0034158 A1* | 2/2010 | Meylan | 370/329 |
| 2010/0172311 A1* | 7/2010 | Agrawal et al. | 370/329 |
| 2010/0284366 A1* | 11/2010 | Zhu | 370/331 |
| 2011/0143770 A1* | 6/2011 | Charbit et al. | 455/456.1 |

FOREIGN PATENT DOCUMENTS

| | | |
|---|---|---|
| EP | 2152017 A1 | 2/2010 |
| WO | 0111914 A1 | 2/2001 |
| WO | 2009038359 A2 | 3/2009 |

OTHER PUBLICATIONS

3GPP TS 36.214 version 9.0.0 Release 9 (Dec. 2009).*
International Search Report issued in corresponding International application No. PCT/SE2010/050735, date of mailing Jan. 28, 2011.
Qualcomm Incorporated: "Completion of OTDOA in LPP", 3GPP Draft; R2-100821, 3rd Generation Partnership Project (3GPP), Mobile Competence Centre; 650, Route Des Lucioles; F-06921 Sophia-Antipolis Cedex, France, vol. RAN WG2, no. Velencia, Spain; Jan. 18, 2010, Jan. 22, 2010, XP050421299.
Qualcomm Incorporated: "Completion of LPP Common Material", 3GPP Draft; R2-100854, 3rd Generation Partnership Project (3GPP), Mobile Competence Centre; 650, Route Des Lucioles; F-06921 Sophia-Antipolis Cedex, France, vol. RAN WG2, no. Velencia, Spain; Jan. 18, 2010, Feb. 9, 2010, XP050421319.
TSG RAN Wg 2: "Response LS on RSTD Measurement for OTDOA and PRS Periodicity" 3GPP Draft; R3-092706_R2-096265, 3rd Generation Partnership Project (3GPP), Mobile Competence Centre; 650, Route Des Lucioles; F-06921 Sophia-Antipolis Cedex, France, no. Jeju, Korea; Nov. 9, 2009, XP050392213.
Ericsson, et al.: " Measurement Configuration and Reporting Mechanisms for RSTD" 3GPP Draft; R4-093056 RSTD Measurement Reporting, 3rd Generation Partnership Project (3GPP), Mobile Competence Centre; 650, Route Des Lucioles; F-06921 Sophia-Antipolis Cedex, France, no. Shenzhen, China, Aug. 17, 2009, XP050354164.
Russian Office Action in related Russian application No. 2012139962/07(064584) dated May 21, 2014.
Ran WG4; "Response on Assistance Information for Otdoa Positioning support for LTE"; 3GPP TSG RAN WG4 Meeting #53; R4-095038; Release 9; pp. 1-3; Nov. 9-13, 2009; Jeju, Korea.
Chinese Office Action in related Chinese Application No. 201080064250.1 dated Sep. 28, 2014.

\* cited by examiner

FULLY SYNCHRONOUS, Δ=0

ASYNCHRONOUS WITH KNOWN OFFSET, Δ IS KNOWN

ASYNCHRONOUS WITH PARTIAL ALIGNMENT, Δ∈[-0.5 ms, 0.5 ms] IS RANDOM

FULLY ASYNCHRONOUS, Δ IS RANDOM

301

| f1\f2 | A | 1/2 A | NA |
|---|---|---|---|
| A | A | - | - |
| 1/2 A | - | - | - |
| NA | - | - | - |

| f1\f2 | A | 1/2 A | NA |
|---|---|---|---|
| A | 1/2 A | 1/2 A | - |
| 1/2 A | 1/2 A | 1/2 A | - |
| NA | - | - | - |

| f1\f2 | A | 1/2 A | NA |
|---|---|---|---|
| A | NA | NA | NA |
| 1/2 A | NA | NA | NA |
| NA | NA | NA | NA |

FIG. 3(c)

INTER-FREQUENCY POSITIONING MEASUREMENTS

TECHNICAL FIELD

The present invention relates in general to signal measurements in wireless communications networks and in particular to wireless network architectures that utilize inter-frequency signal measurements from multiple cells for positioning, location and location-based services.

BACKGROUND

At its inception radio telephony was designed, and used for, voice communications. As the consumer electronics industry continued to mature, and the capabilities of processors increased, more devices became available to use wireless transfer of data and more applications became available that operate based on such transferred data. Of particular note are the Internet and local area networks (LANs). These two innovations allowed multiple users and multiple devices to communicate and exchange data between different devices and device types. With the advent of these devices and capabilities, users (both business and residential) found the need to transmit data, as well as voice, from mobile locations.

The infrastructure and networks which support this voice and data transfer have likewise evolved. Limited data applications, such as text messaging, were introduced into the so-called "2G" systems, such as the Global System for Mobile (GSM) communications. Packet data over radio communication systems became more usable in GSM with the addition of the General Packet Radio Services (GPRS). 3G systems and, then, even higher bandwidth radio communications introduced by Universal Terrestrial Radio Access (UTRA) standards made applications like surfing the web more easily accessible to millions of users.

Even as new network designs are rolled out by network manufacturers, future systems which provide greater data throughputs to end user devices are under discussion and development. For example, the so-called $3^{rd}$ Generation Partnership Project (3GPP) Long Term Evolution (LTE) standardization project is intended to provide a technical basis for radio communications in the decades to come. Among other things of note with regard to LTE systems is that they will provide for downlink communications (i.e., the transmission direction from the network to the mobile terminal) using orthogonal frequency division multiplexing (OFDM) as a transmission format and will provide for uplink communications (i.e., the transmission direction from the mobile terminal to the network) using single carrier frequency division multiple access (FDMA).

The capability to identify a user's geographical location in the network has enabled a large variety of commercial and non-commercial services, e.g., navigation assistance, social networking, location-aware advertising, emergency calls, etc. Different services may have different positioning accuracy requirements imposed by the application. In addition, some regulatory requirements on the positioning accuracy for basic emergency services exist in some countries, e.g., Federal Communication Commission's (FCC's) regulatory requirements for E911 services in the United States.

In many environments, the position of a user terminal can be accurately estimated by using positioning methods based on GPS (Global Positioning System). Nowadays networks have also often a possibility to assist UEs in order to enable the terminal to perform measurements at much lower receiver sensitivity level and improve GPS cold start or start up performance (Assisted-GPS positioning, or A-GPS). GPS or A-GPS receivers, however, may be not necessarily available in all wireless terminals. Furthermore, GPS is known to often fail in indoor environments and urban canyons due to lack of satellite coverage. A complementary terrestrial positioning method, called Observed Time Difference of Arrival (OTDOA), is therefore being standardized by 3GPP.

With OTDOA, a terminal measures the timing differences for downlink reference signals received from multiple distinct locations. For each (measured) neighbor cell, the UE measures Reference Signal Time Difference (RSTD) which is the relative timing difference between neighbor cell and the reference cell. The UE position estimate is then found as the intersection of hyperbolas corresponding to the measured RSTDs. At least three measurements from geographically dispersed base stations (BSs) with a good geometry are needed to solve for two coordinates of the terminal and the receiver clock bias. In order to solve for position, precise knowledge of the transmitter locations and transmit timing offset is needed. Position calculation can be conducted, for example, by a positioning server (Evolved Serving Mobile Location Center or E-SMLC in LTE) or UE. The former approach corresponds to the UE-assisted positioning mode, whilst the latter corresponds to the UE-based positioning mode.

To enable positioning in LTE and facilitate positioning measurements of a proper quality and for a sufficient number of distinct locations, new physical signals dedicated for positioning (positioning reference signals, or PRS) have been introduced and low-interference positioning subframes have been specified in 3GPP. PRS are transmitted with a pre-defined periodicity of 160, 320, 640 and 1280 ms. PRS are transmitted from one antenna port (R6) according to a pre-defined pattern as described, for example, in the standard specification 3GPP TS 36.211, Evolved Universal Terrestrial Radio Access (E-UTRA); Physical Channels and Modulation, the disclosure of which is incorporated here by reference.

A frequency shift, which is a function of a physical cell identity (PCI), can be applied to the specified PRS patterns to generate orthogonal patterns and modelling the effective frequency reuse of six, which makes it possible to significantly reduce neighbor cell interference on the measured PRS and thus improve positioning measurements. Since, for OTDOA positioning, PRS signals from multiple distinct locations need to be measured, the UE receiver may have to deal with PRS signals that are much weaker than those received from the serving cell. Furthermore, without the approximate knowledge of when the measured signals are expected to arrive in time and what is the exact PRS pattern, the UE would need to do signal search within a large window, which would impact the time and accuracy of the measurements as well as the UE complexity. To facilitate UE measurements, the network transmits assistance data to the UE, which includes, among others things, a neighbor cell list containing physical cell identity (PCIs) of neighbor cells, the number of consecutive downlink subframes, PRS transmission bandwidth, etc.

To facilitate inter-frequency positioning measurements, when a neighbor cell in the assistance data is not on the UE's serving frequency, E-UTRA Absolute Radio Frequency Channel Number (EARFCN) for this cell is also signalled. The 3GPP standard specifies the positioning neighbor cell lists comprising up to 24 neighbor cells per carrier frequency. These are the cells for which the network signals the assistance data.

In LTE OTDOA, the UE measures Reference Signal Time Difference (RSTD) which has been defined in the standard document 3GPP TS 36.214, Evolved Universal Terrestrial Radio Access (E-UTRA); Physical layer measurements, the disclosure of which is incorporated here by reference. The measurements are specified for both intra-frequency and inter-frequency and conducted in the RRC_CONNECTED state (see Table 1 below).

TABLE 1

3GPP RSTD measurement definition

| | |
|---|---|
| Definition | The relative timing difference between the neighbor cell j and the reference cell i, defined as $T_{SubframeRxj}$ – $T_{SubframeRxi}$, where: $T_{SubframeRxj}$ is the time when the UE receives the start of one subframe from cell j $T_{SubframeRxi}$ is the time when the UE receives the corresponding start of one subframe from cell i that is closest in time to the subframe received from cell j. The reference point for the observed subframe time difference shall be the antenna connector of the UE. |
| Applicable for | RRC_CONNECTED intra-frequency RRC_CONNECTED inter-frequency |

The inter-frequency measurements, including RSTD, are conducted during periodic inter-frequency measurement gaps which are configured in such a way that each gap starts at an SFN (System Frame Number) and subframe meeting the following condition:

SFN mod $T$=FLOOR(gapOffset/10);

subframe=gapOffset mod 10;

with T=MGRP/10, where MGRP stands for "measurement gap repetition period." E-UTRAN provides a single measurement gap pattern with constant gap duration for concurrent monitoring of all frequency layers and RATs. Two configurations are supported by the UE, with MGRP of 40 and 80 ms, both with the measurement gap length of 6 ms. In practice, due to the switching time, this leaves less than 6 but at least 5 full subframes for measurements within each such measurement gap. An RSTD measurement is considered to be an inter-frequency measurement when the reference cell and/or the neighbor cell belong to the frequency, which is different than the serving cell carrier frequency.

In LTE, measurement gaps are configured by the network to enable measurements on the other LTE frequencies and/or other RATs. The gap configuration is signaled to the UE over RRC protocol as part of the measurement configuration. In multi-carrier LTE, the inter-frequency measurement gaps are so far intended mainly for performing mobility measurements such as Reference Signal Received Power (RSRP) and Reference Signal Received Quality (RSRQ). These measurement gaps enable UEs to perform measurements over the synchronization signals, i.e. primary synchronization signals (PSS) and secondary synchronization signals (SSS), and cell-specific reference signals (CRS) to enable inter-frequency handover and enhance system performance.

Synchronization signals are transmitted over 62 resource elements in the center of the allocated bandwidth in subframe 0 and 5. The PSS is transmitted in the last OFDM symbol and the SSS is transmitted in the second last OFDM symbol of the first slot of a subframe. CRS symbols are transmitted every subframe and over the entire bandwidth according to one of the standardized time-frequency pattern. Different cells can use 6 different shifts in frequency and 504 different signals exist. With 2 TX antennas, the effective reuse for CRS is three.

As can be seen from the above, both synchronization signals and CRS are transmitted relatively often, although PSS and SSS are transmitted less frequently than CRS. This leaves enough freedom when deciding the exact timing of measurement gaps so that a gap could cover enough symbols with the signals of interest, i.e. PSS/SSS and/or CRS. With a 6 ms measurement gap, at most 2 SSS and 2 PSS symbols can be received with very precise timing, which may be not very realistic, while capturing 1 SSS and 1 PSS symbols is possible without any timing restriction on the measurement gaps since the minimum required effective measurement time is 5 ms on average.

In the current technologies, and due to the fact that there is typically only a single receiver in most UEs, the use of measurement gaps is necessary to conduct inter-frequency measurements. In the prior solutions, the exact time slots when the inter-frequency measurements are performed are typically decided by the network based on some criteria. For instance when RSRP and/or RSRQ from the serving cell fall below a threshold or there are no good intra-frequency candidate cells for performing handover, such inter-frequency measurements can be performed.

When measuring PSS, SSS and/or CRS on another frequency (i.e. mobility measurements), the exact timing of inter-frequency measurement gaps is essentially unrestricted. However, a number of issues arise associated with inter-frequency measurements.

One such issue is that the configured measurement gaps may be misaligned with positioning occasions. The standardized PRS have a minimum periodicity of 160 ms, which is far beyond the maximum length of an inter-frequency measurement gap. The maximum periodicity of the PRS occasion is 1280 ms. With no restriction on the exact timing of the measurement gaps, it may happen with a high probability that the other-frequency PRS will always be missed, although the UE will trust the assistance data received from the network and will try to measure PRS for the specified neighbor cell on the specified frequency. This in turn, may cause a number of problems. For example, in the case of false detection, a poor or inaccurate measurement may be used for position estimation by the UE or by the network. Additionally, the useful part of the overall measurement time decreases since the time spent for measuring on the other frequency and searching for a PRS signal which is not there (i.e. is outside the measurement gap) is essentially lost, and could have been spent for measuring other cells. Moreover, the UE cannot trust a network which provides unreliable assistance data and degrades the overall positioning performance and the UE may thus also choose to never conduct inter-frequency positioning measurements, which makes signaling of this information useless and consumes the network resources inefficiently.

Another issue which may arise is that the effective measurement length does not fully cover the maximum length of a positioning occasion. This is because up to 6 consecutive subframes can be configured for each positioning occasion, whilst the effective measurement period is shorter than 6 ms.

Yet another problem with conventional measurement approaches is that measurement gaps occur more often than positioning occasions. The periodicity of inter-frequency measurement is either 40 ms or 80 ms, while the minimum PRS periodicity is 160 ms. This implies that roughly at most only one-quarter (with 40 ms gap period) or one-half (with 80 ms gap period) of the total measurement gap time is usefully spent for PRS measurements, while the other time is lost, which time could have been spent for measuring cells on other frequencies.

One solution to these problems with inter-frequency measurements would be to limit positioning measurements only to intra-frequency. However, such a solution is undesirable since it underutilizes the available technology, e.g., including a UEs' capability of measuring on another frequency; the RSTD measurement standardized by RAN1 for both intra- and inter-frequency, the already agreed signaling support for inter-frequency measurements (e.g., the EARFCN indicator); the information available in the network and the possibility in the network to make the inter-frequency measurements working also for positioning; the multi-layer network structure, where different layers could operate on different frequencies which is also more efficient from the interference coordination point of view; the multi-carrier network operation which has been successfully used in earlier generations, etc., and that interference on different carrier frequency layers may be different and in some scenarios it may be easier to find sufficient cells on the inter-frequency for the positioning measurements.

Accordingly, it would be desirable to provide methods, devices, systems and software that would avoid the afore-described problems and drawbacks and enable inter-frequency measurements, e.g., for positioning, in measurement gaps.

SUMMARY

According to an embodiment, a method of enabling inter-frequency reference signal time difference (RSTD) measurements on reference signals is provided. The method includes generating, by a network node for a user equipment, an inter-frequency neighbor list of neighbor cells intended to be measured, each of which satisfies an alignment condition and a sufficient measurement time. According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal. The method also includes transmitting the inter-frequency neighbor list to the user equipment.

According to another embodiment, a network node has an interface configured to communicate with a user equipment via cells and a processing unit. The processing unit, which is connected to the interface, is configured to control the interface to transmit towards the user equipment via a reference cell, an inter-frequency neighbor list which includes information about neighbor cells, each of which satisfies an alignment condition and a sufficient measurement time. According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal.

According to another embodiment, a method of performing inter-frequency reference signal time difference (RSTD) measurements by a user equipment is provided. The method includes receiving a first signal having a first frequency, via a reference cell associated with the user equipment, and a second signal having a second frequency received via a neighbor cell included in an inter-frequency neighbor list. The method further includes performing first inter-frequency reference signal time difference measurements on position reference signals of said neighbor cell during first measurement gaps that overlap with positioning subframes of the second signal. The neighbor cell is included in the inter-frequency neighbor list intended for positioning if satisfying an alignment condition and a sufficient measurement time. According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal. The measuring gaps occur more often than the position reference signals.

According to another embodiment, a user equipment has an interface and a processing unit. The interface is configured to receive a first signal having a first frequency via a reference cell and a second signal having a second frequency received via a neighbor cell included in an inter-frequency neighbor list provided by a network node. The processing unit, which is connected to the interface, is configured to perform first inter-frequency reference signal time difference (RSTD) measurements on position reference signals, during first measurement gaps that overlap with positioning subframes of the second signal. The neighbor cell is included in the inter-frequency neighbor list intended for positioning if satisfying an alignment condition and a sufficient measurement time. According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal. The measuring gaps occur more often than the position reference signals.

According to another embodiment, a method of performing measurements by a user equipment, which receives a first signal having a first frequency, via a reference cell, and second signals having respective second frequencies, via neighbor cells, is provided. The method includes performing inter-frequency reference signal time difference (RSTD) measurements on first reference signals which are transmitted more frequently than second reference signals, during measurement gaps, when subframes of the first signal and corresponding subframes of the second signal are not synchronized.

According to another embodiment, a user equipment includes an interface and a processing unit. The interface is configured to receive a first signal having a first frequency, via a reference cell and second signals having respective second frequencies, via neighbor cells. The processing unit, which is connected to the interface, is configured to perform inter-frequency reference signal time difference (RSTD) measurements on first signals which are transmitted more frequently than second reference signals, when subframes in the first signal and corresponding subframes of the second signal are not synchronized.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3(a), 3(b) and 3(c) illustrate alignment classes based on alignment of intra- and inter-frequencies f1 and f2.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Even though PRS have been specifically designed for positioning measurements, and, in general, are characterized by better signal quality than other reference signals, the standard does not mandate using PRS. Other type of reference signals e.g. cell-specific reference signals (e.g., CRS) can in principle also be used for performing positioning measurements.

According to embodiments RSTD inter-frequency measurements are enabled by, for example, ensuring a sufficient overlap of the inter-frequency measurement gaps and positioning subframes or by performing the inter-frequency measurements on signals other than PRS signal (e.g., CRS). According to some embodiments, only the cells that satisfy the sufficient overlap condition can be considered for inclusion into an inter-frequency neighbor list intended for positioning. Establishing a sufficient overlap condition, methods for aligning measurement gaps and positioning subframes, and also techniques for triggering the measurement gaps for positioning (if needed) are also aspects of embodiments. Moreover, although some embodiments focus on inter-frequency measurements used for positioning of UEs, the present invention is equally applicable to other type of measurements and is not limited to positioning.

Figure 1:
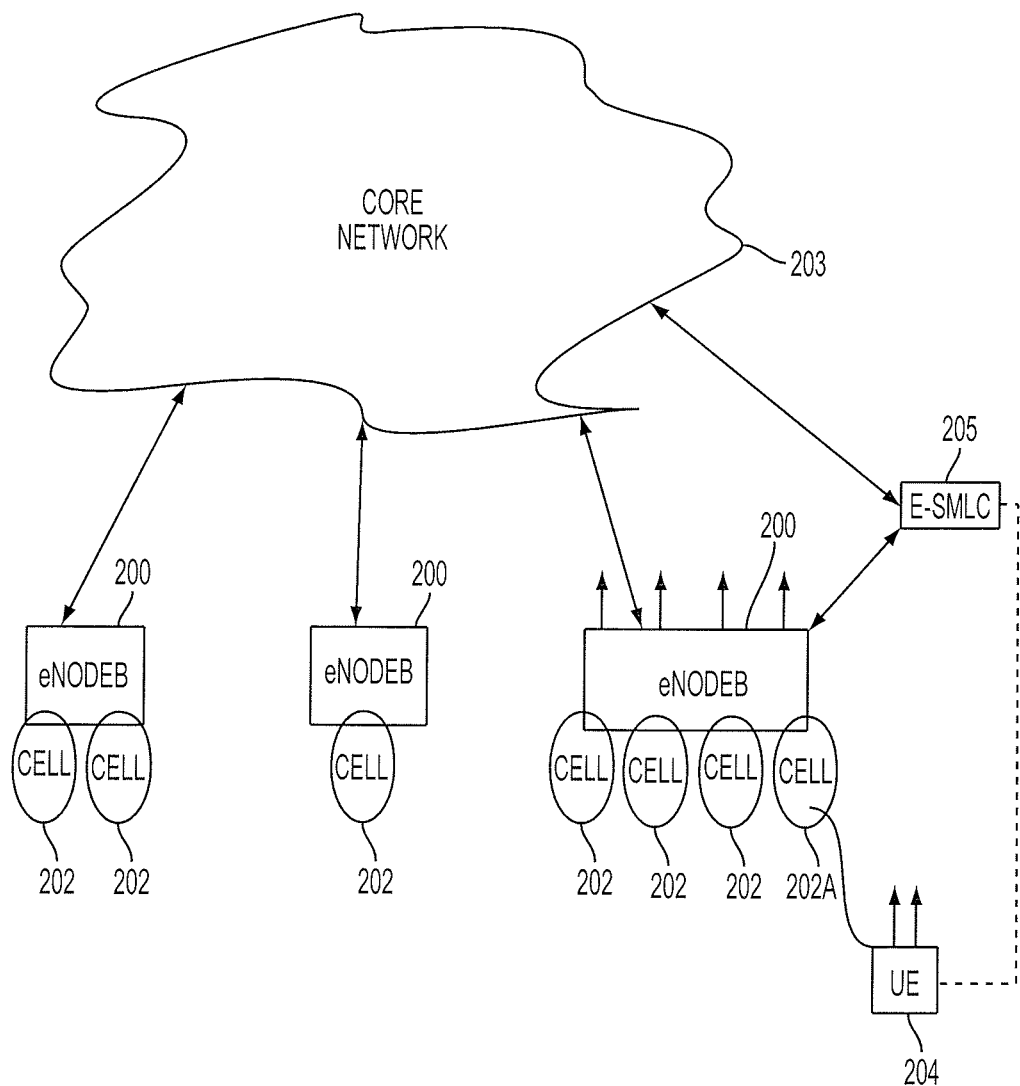
FIG. 1 illustrates a radio communication system.

To provide some context for the more detailed discussion of inter-frequency measurements according to these embodiments, consider first the radio communication system illustrated in FIG. 1. Beginning with the radio access network nodes and interfaces in FIG. 1, it will be seen that this particular example is provided in the context of LIE systems. Nonetheless, the present invention is not limited in its applicability to LTE systems and can instead be used in any system wherein such inter-frequency measurements may be desirable. Since, however, the example in FIG. 1 is provided in terms of LTE, the network node which transmits and receives over the air interface is termed an eNodeB (i.e., evolved Node B), several of which eNodeBs 200 are illustrated therein.

In the context of the air interface, each eNodeB 200 is responsible for transmitting signals toward, and receiving signals from, one or more cells 202. Each eNodeB 200 according to this embodiment includes multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. An eNode may also include one transmitter and one receiver. Note that, as used herein, the phrase "transmit antennas" is specifically meant to include, and be generic to, physical antennas, virtual antennas and antenna ports. The eNodeBs 200 are also responsible for many higher functions associated with handling communications in the system including, for example, scheduling users, handover decisions, and the like. The interested reader who desires more information regarding transmit or receive functions associated with LTE or other systems in which these embodiments may be deployed is directed toward the book entitled "3G Evolution—HSPA and LTE for Mobile Broadband", to Erik Dahlman et al., published by Elsevier Ltd., 2007, the disclosure of which is incorporated by reference.

According to embodiments, a UE 204 which is operating in a cell 202A as shown in FIG. 1 may perform inter-frequency measurements on various signals being transmitted by various ones of the eNodeBs illustrated in FIG. 1, as will be described below. Similarly, the eNodeBs 200 will transmit signals which will be the subject of such inter-frequency measuring.

Figure 2A:
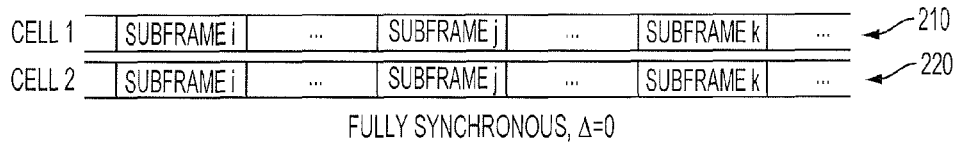
FIG. 2(a) illustrates frame alignment in fully synchronized networks.
Figure 2B:
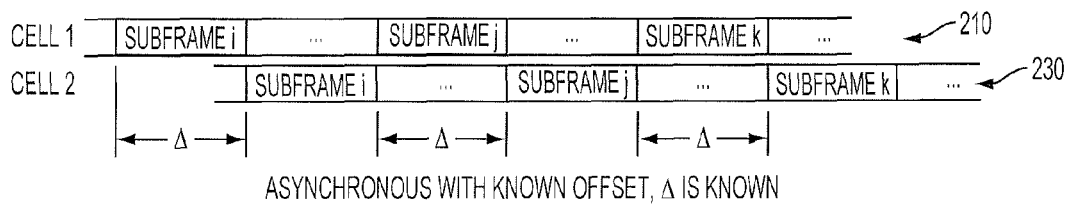
FIG. 2(b) illustrates frame alignment in asynchronous networks with a known offset.
Figure 2C:
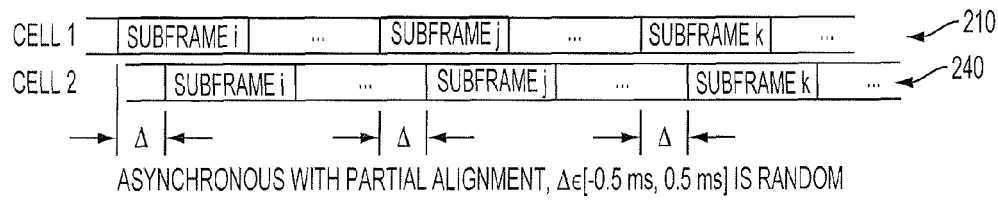
FIG. 2(c) illustrates frame alignment in asynchronous networks with partial alignment.
Figure 2D:
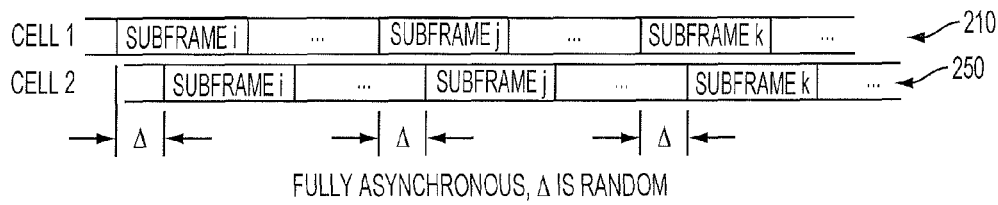
FIG. 2(d) illustrates frame alignment in fully asynchronous networks.

Different types of network synchronization and positioning subframe alignment can have different impacts on feasibility of inter-frequency measurements. From the point of view of synchronization in time, networks can be classified as follows (1) fully synchronized networks, e.g., frame-level synchronized as illustrated in FIG. 2(a), (2) asynchronous networks with a known offset e.g., subframe-synchronized as illustrated in FIG. 2(b), (3) asynchronous networks with partial alignment, e.g., wherein the maximum time difference between two subframes in different cells is within half a subframe as illustrated in FIG. 2(c) and (4) fully asynchronous networks, e.g., wherein the cells are not synchronized at all and operate independently as illustrated in FIG. 2(d). A system with different combination of 2(a)-2(d) can also be envisioned.

When the system is a fully synchronized network, subframes of a signal transmitted via a first cell (210) begin at the same moment in time as corresponding subframes of a signal transmitted via a second cell (220) as illustrated in FIG. 2(a).

When the system is an asynchronous network with a known offset, subframes of a signal transmitted via a second cell (230) have the same offset in time (A) relative to corresponding subframes of a signal transmitted via a first cell (210), as illustrated in FIG. 2(b).

When the system is an asynchronous network with partial alignment, subframes of signals transmitted via different second cells (240) have various different offsets in time (Δ) relative to respective subframes of a signal transmitted via a first cell (210), as illustrated in FIG. 2(c). However, the various offsets are within a half of subframe (e.g., if a subframe lasts for 1 ms, $\Delta_i \in [-0.5, 0.5]$ ms, where i=1, 2, ...).

When the system is a fully asynchronous network, no correspondence between a beginning of a subframe of a signal transmitted via a first cell (210) and a beginning of a corresponding subframe of a signal transmitted via a second cell (250) can be relied upon, as illustrated in FIG. 2(d).

The time offset between any two cells can be written in a general form as $\Delta + \epsilon$, where $\Delta$ is the time difference between subframes with the same indices (i.e. corresponding subframes) in the two cells, ands is the synchronization (clock) error which depends on the synchronization method used (e.g., GPS clock, etc.). In LTE TDD, which is typically a synchronous system, the synchronization error between any two cells with cell range up to 3 km in the network is limited to 3 μs. Beyond 3 km of cell range the maximum allowed error is 10 μs. It should be noted that the cells may belong to different eNode Bs 200. For cells located in the same eNodeB 200, the synchronization error between them can be significantly lower than the standardized requirement.

In a synchronized network, the cells are synchronized in each frequency but also among frequencies, although the inter-frequency synchronization error is larger than that for intra-frequency. For example, in intra-band contiguous multi-carrier UTRAN FDD, any two adjacent component carriers within the same Node B can be synchronized within ±65 ns. In inter-band non-contiguous multi-carrier system UTRAN FDD, any two component carriers belonging to different frequency bands within the same Node B can be in the range between ±325 ns and ±525 ns. A similar level of synchronization requirements is expected for the multi-carrier LTE systems currently being specified.

The offset $\Delta$ in asynchronous networks with known offset is typically decided by planning, for example, targeting reducing the interference on physical signals (e.g., synchronization signals) or control channels. From the positioning point view, this type of network can be viewed as a synchronous network, since the positioning configuration index can be configured differently in different cells to account for $\Delta$ and to align positioning subframes among the cells.

Thus, the following alignment assumptions can be made according to embodiments for the four network types:

Aligned (A):

For fully synchronized networks and asynchronous networks with known $\Delta$ counted in full subframes, it is reasonable to assume that positioning subframes are time-aligned in all cells;

Half-Subframe Aligned (½ A):

For asynchronous networks with the capability of aligning subframes within half a subframe, it can be assumed that the maximum absolute timing difference between positioning subframes in two cells is 0.5 subframe, which is the current baseline 3GPP assumption for positioning subframes in asynchronous networks;

Not Aligned (NA):

In fully asynchronous networks, the maximum timing difference between two subframes is 10 ms (the radio frame length) and essentially no assumption on positioning subframe alignment can be made.

Furthermore, not only the alignment within each frequency is important, but also the possibility of alignment across frequencies. Assume the same alignment categories apply to inter-frequency, which define how any cell operating on frequency f1 is aligned with any cell operating on frequency f2. Assume also that the same alignment category applies for all cells operating on the same frequency. With these assumptions, FIGS. 3(a)-3(c) summarize the overall system alignment categories depending on combinations of intra- and inter-frequency alignment for frequencies f1 and f2. FIG. 3(a) corresponds to the inter-frequency aligned (Table 301). FIG. 3(b) corresponds to the inter-frequency half-subframe aligned (Table 302). FIG. 3(c) corresponds to the inter-frequency not aligned cases (Table 303). For example, the system can only be aligned when f1 is aligned, f2 is aligned, and f1 and f2 are inter-frequency aligned as indicated by FIG. 3(a). However, independently of intra-frequency alignment, the system is always not aligned when f1 and f2 are not aligned between themselves as indicated by FIG. 3(c). Another example is that there cannot be inter-frequency, half-subframe alignment if at least one operating frequency is not aligned, i.e. such cases are inapplicable (from the system implementation point of view) and marked with a dash "-", e.g., as shown in FIG. 3(b), and with inter-frequency half-subframe alignment the system can be at best half-subframe aligned even if each of the frequencies is aligned.

In the above it has been assumed that the same alignment category applies for all cells operating on the same frequency. In practice, it may happen that within the same frequency some cells are synchronized and other cells are half-subframe synchronized or not synchronized at all. In this case, it is proposed to group cell based on the synchronization principle for each frequency and treat each group separately with respect to other frequencies. The classification in FIGS. 3(a)-3(c) is therefore still applicable with an exception that a group within f1 (instead of f1) and a group within f2 (instead of f2) are considered, so that all of the techniques described in these embodiments are also applicable to the special case when several groups with different alignment are present within a frequency.

Note also that FIGS. 3(a)-3(c) classify a system which consists of at least two frequencies and at least one cell operating on each frequency. However, from the UE perspective, for inter-frequency measurements it is sufficient to look at the classification of the combination of each cell pair separately (the reference cell and the cell to be measured on a different frequency), while applying the same classification principle. The term "system alignment category" as used herein denotes the cell pair alignment category.

Next the impact of the defined system alignment category on inter-frequency measurements according to embodiments is discussed. For intra-frequency, using PRS for the not aligned case is less practical than measuring RSTD on some other type of signals which are transmitted more often, e.g., CRS signals or PSS/SSS signals. This is because the major gain with PRS and positioning subframes is low interference which cannot be ensured when the cells are not synchronized.

The same approach can be applied according to embodiments for inter-frequency measurements for the case when the system is not aligned, i.e. independently of how the intra-frequency measurements are conducted in each of the frequencies. That is, if the system classifies as "NA" according to the classification illustrated in FIGS. 3(a)-3(c) the inter-frequency measurements are performed on signals other than PRS signals. In one embodiment, such inter-frequency measurements are performed on CRS signals.

For systems that are classified as aligned or half-subframe aligned, the inter-frequency measurements may also be conducted on other than PRS signals, as for the non-aligned case, but using PRS is also possible if aligning of measurement gaps and positioning subframes can be ensured, which is the subject of the further discussion in the following sections.

Figure 4:
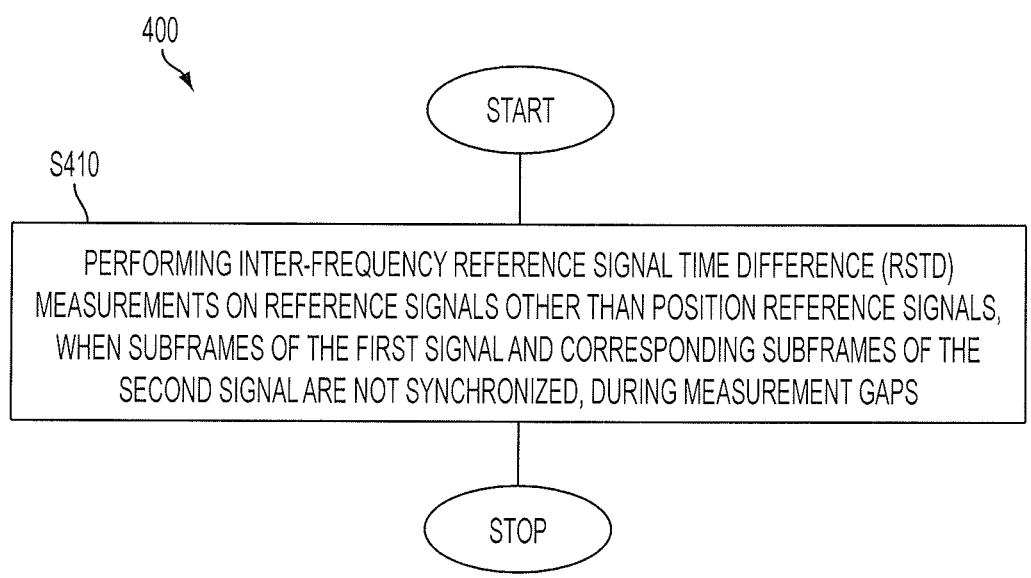
FIG. 4 is a flow chart of a method for performing positioning (e.g., RSTD) measurements according to an embodiment.

To summarize the foregoing embodiment, a method 400 for performing positioning (e.g., RSTD) measurements can include the steps shown in the flow chart of FIG. 4. When, a reference cell (C1) operating on a first frequency (f1) and a neighbor cell (C2) operating on a frequency (f2) are not synchronized (NA), reference signal time difference measurements are performed on signals other than PRS signals, e.g., such as cell reference signals (CRS).

For inter-frequency measurements (f1 and f2 are different), when cell 1 and cell 2 are aligned or half-subframe aligned, the measurements can either be performed on PRS or other-than-PRS signals. However, to enable inter-frequency PRS measurements, inter-frequency measurement gaps and positioning subframes need to be aligned. The alignment category for a pair of cells in question can be either determined on the cell-by cell basis, when such information is available in the system, or can be deduced for the given frequencies from the system alignment indicator defined according the classification in FIGS. 3(a)-3(c).

Figure 5:
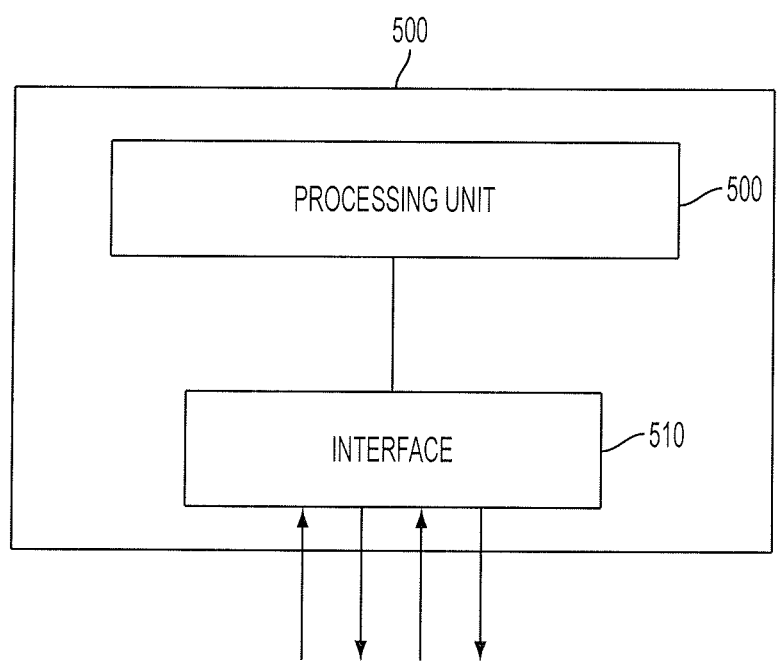
FIG. 5 illustrates a user equipment according to an embodiment.

FIG. 5 illustrates an user equipment 500 according to an embodiment. The user equipment includes an interface 510 and a processing unit 520.

The interface 510 receives signals from network nodes (e.g. 200, in FIG. 1) received via various cells (e.g. 202, 202A). The interface 510 may also receive from a network node a list of neighbor cells intended to be measured by the UE 500, e.g., for positioning.

The processing unit 520 is connected to the interface 510 and is configured to perform inter-frequency reference signal time difference (RSTD) measurements on reference signals.

As explained above, when the inter-frequency measurements are to be conducted on PRS signals, it is important to ensure that the overlap between the positioning subframes and the effective measurement time within measurement gaps for a particular UE is sufficient to achieve the required measurement quality and positioning accuracy for this UE. This condition is further referred to herein as the "sufficient measurement time condition", which condition is described in more detail below. In this context, two cases need to be considered: (1) the case where inter-frequency measurement gaps have been already configured and used by the UE before the positioning session has started, and (2) the case where no inter-frequency measurement gaps have been considered so far for the UE which is to be positioned.

For the first case, the positioning node needs to check whether the sufficient measurement time condition holds with the current measurement gap configuration. If necessary and if possible, the measurement gaps may be reconfigured and shifted in time to match in time the desired time slots on a different frequency. One of the approaches described below for triggering gap configuration could also be adapted for gap reconfiguration.

For the second case, one embodiment triggers configuration and activation of inter-frequency measurement gaps for the target UE such that the sufficient measurement time holds. The trigger could be initiated by a positioning node (e.g., eSMLC in LTE) in, for example, the following non-limiting ways. For example, triggering configuration/activation of inter-frequency measurement gaps can be performed by inclusion into a positioning cell neighbor list which signaled over LPP (LTE Positioning Protocol) or any other radio interface protocol such as RRC (Radio Resource Control) of a cell operating on a different frequency (with the frequency indicated in the assistance data) based on which the UE configures the gaps by itself utilizing the assistance information, e.g., estimated RSTD and uncertainty, received from the network (UE implementation impact). Alternatively, triggering configuration/activation of inter-frequency measurement gaps can be performed by instructing the serving BS to configure inter-frequency measurement gaps for a given UE and activate them at a certain time.

Thus to summarize, the foregoing embodiments describe, among other things, triggering configuration and activation of inter-frequency measurement gaps by the positioning node for a given UE, where the trigger is, for example, the inclusion into the positioning neighbor cells list (signaled over LPP) of a cell on a different frequency than the serving cell, or the instruction to the serving BS. Additionally, the foregoing embodiments describe triggering reconfiguration and shifting in time of already configured measurement gaps.

The positioning neighbor cell lists are generated in a network node 200, which may be, for example, an eNodeB or an positioning node E-SMLC 205 in FIG. 1. A UE positioning architecture applicable to E-UTRAN is illustrated in FIG. 5-1 of 3GPP TS 36.305 v9.2.0 (2010-03) which is incorporated here by reference.

Figure 6:
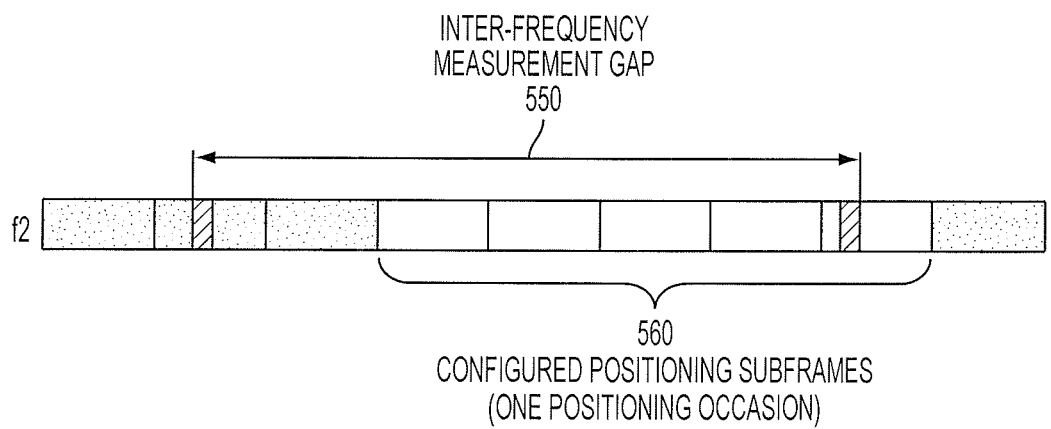
FIG. 6 illustrates an example of overlapping in time of a measurement gap with positioning subframes.

As mentioned above, a significant criterion associated with inter-frequency measurements and configuring inter-frequency measurement gaps according to some embodiments is the sufficient measurement time. FIG. 6 illustrates an example of overlapping in time of a measurement gap (550) with positioning subframes (560) in a neighbor cell operating on frequency f2, where the UE inter-frequency switching time corresponds to the striped areas within the measurement gap. The measurement time is sufficient when the necessary measurement quality and positioning accuracy can be achieved. The necessary time is a trade-off between the PRS transmission bandwidth and the number of consecutive positioning subframes. For example, to meet FCC requirements, a small bandwidth (i.e. 1.4 MHz) typically requires up to 6 consecutive positioning subframes (see also 3 GPP 36.133). Furthermore, there may be required more than one positioning occasion, especially for asynchronous networks. However, not all applications require the positioning accuracy specified by FCC. So, the sufficient measurement time shall be defined by the network based on the requested positioning accuracy, positioning configuration in the cell to be measured, and the estimated signal quality. Also, some measurement statistics and measurement history information may be additionally utilized.

Now assume that the sufficient measurement time is known for a given situation. From FIG. 6, it can be seen that the effective PRS measurement is maximized when the beginning of the first positioning subframe is aligned with the beginning of the interval when the switching period (striped bar) is over and the UE can start measuring on f2. It is, however, important to note that the precise scheduling of the measurement gap in time would only be possible if the UE would be able to synchronize to the measured cell. This may be possible, for example, when the UE has been already performing inter-frequency measurements on this cell, which simplifies aligning (reconfiguration) the measurement gaps and the positioning subframes. In the context of positioning, however, such an assumption cannot be made since the cells that are much weaker than the reference cell often need to be measured, which would typically not happen with inter-frequency measurements not intended for positioning. Therefore, it becomes the network's responsibility to correctly place the measurement gap in time to align with the positioning subframes on frequency f2.

The major contributors to a possible misalignment between the time when the effective measurement period starts and the beginning of the first positioning subframes includes the UE switching time, propagation delay and frame misalignment offset (asynchronous networks). In a synchronized network, the SFN are aligned among the cells but also among different frequencies and the contribution of the synchronization error is relatively small compared to other considered delays and can therefore be neglected in view of inter-frequency measurements. On the other hand if the synchronization error (c) is large such as in network with large cells then it may also be considered in determining the sufficient time for positioning measurement in the gap.

Neglecting the contribution due to the synchronization error for simplicity, the measurement gap shall, according to one embodiment, start at:

$$\hat{t}_{f2} - k \cdot e - t_{switch},$$

where $\hat{t}_{f2}$ is the estimated time of the beginning of the first positioning subframe on f2 relative to the reference cell, e is the uncertainty, k=−1 when $\hat{t}_{f2} \geq 0$ and k=1 otherwise, and $t_{switch}$ is the UE switching time from f1 to f2. The same shift apples both for the aligned case and half-subframe aligned case.

According to one embodiment, the UE switching time to frequency f2 in average shall not exceed 0.5 ms within a measurement gap. The maximum propagation delay for cells included in the agreed assistance data is well below 1 ms, and the maximum subframe misalignment for positioning subframes is 0.5 ms. The roughly estimated sum of the aforementioned delays makes it reasonable to assume four full subframes available for inter-frequency positioning measurements as a criterion for including a cell in the positioning neighbor list. Note that the reference cell may be the serving cell.

Addressing one of the problems identified in the Background section, i.e., that measurement gaps can occur more often than positioning occasions, when more than one frequency different from the serving frequency are to be measured, arranging measurement gaps such that they capture more than one frequency for inter-frequency measurements (different frequency in a different gap) would make inter-frequency positioning measurements more efficient and faster. In one embodiment, positioning subframes at different frequencies are time-shifted by 80 ms (half of the minimum PRS periodicity which is 160 ms), which can be implemented in, for example, synchronized networks or networks with co-located multi-frequency cells. For asynchronous FDD networks when multi-frequency cells are not co-located, some signalling may be required to ensure the desired multi-frequency positioning configuration to optimize for inter-frequency positioning measurements. An alternative inter-frequency solution is to measure on PRS on frequencies where the positioning subframes sufficiently overlap with the measurement gaps and measure on other available signals (e.g. CRS) in other frequencies during available inter-frequency measurement gaps.

Thus, to summarize the foregoing discussion, embodiments enable measurements on f2, the shift relative to the reference cell to be applied to schedule inter-frequency measurement gaps is $\hat{t}_{f2} - k \cdot e - t_{switch}$ with k=−1 when $\hat{t}_{f2} \geq 0$ and k=1 otherwise; positioning signals and positioning inter-frequency measurements over multiple frequencies in neighbor and the reference cells (any of which may operate on a frequency different from the serving-cell frequency, as specified, e.g., in 3GPP 36.355) are scheduled such that the measured signals at different frequencies can be measured in different gaps; whether the sufficient measurement time is met or not is defined based on at least some of the following information, requested positioning accuracy, positioning configuration in the cell to be measured (e.g. PRS bandwidth, periodicity, number of consecutive subframes, etc.), estimated signal quality, measurement statistics and measurement history information. Note that the reference cell may or may not be the serving cell. For example, in 36.355 v9.1.0, Sec. 6.5.1.2, an indicator NotSameAsServ0 is used to indicate whether "the ARFCN of the OTDOA reference cell for assistance data is not the same as the ARFCN of the target devices's current serving cell." In case of the inter-frequency measurement, if the reference cell associated with the user equipment (UE), which has been requested to perform the said inter-frequency measurement, also belongs to an inter-frequency carrier (i.e. not to the carrier frequency of the serving cell) then the reference cell is measured in measurement gaps.

In the afore-described embodiments, methods regarding how to achieve the desired alignment between the measurement gaps and positioning subframes have been discussed. However, such an alignment is not always possible. Time alignment information is considered in addition to other information when building up the assistance data signalled to the UE (e.g., OTDOA neighbor cell list or ECID to facilitate inter-frequency PRS signal quality measurements). Such other information may include positioning configuration information (e.g., PRS transmission bandwidth, environment type and PRS periodicity), UE positioning accuracy requirements, etc. Cells for which the sufficient measurement time can be met are included in the neighbor cell list for inter-frequency measurements.

Figure 7:
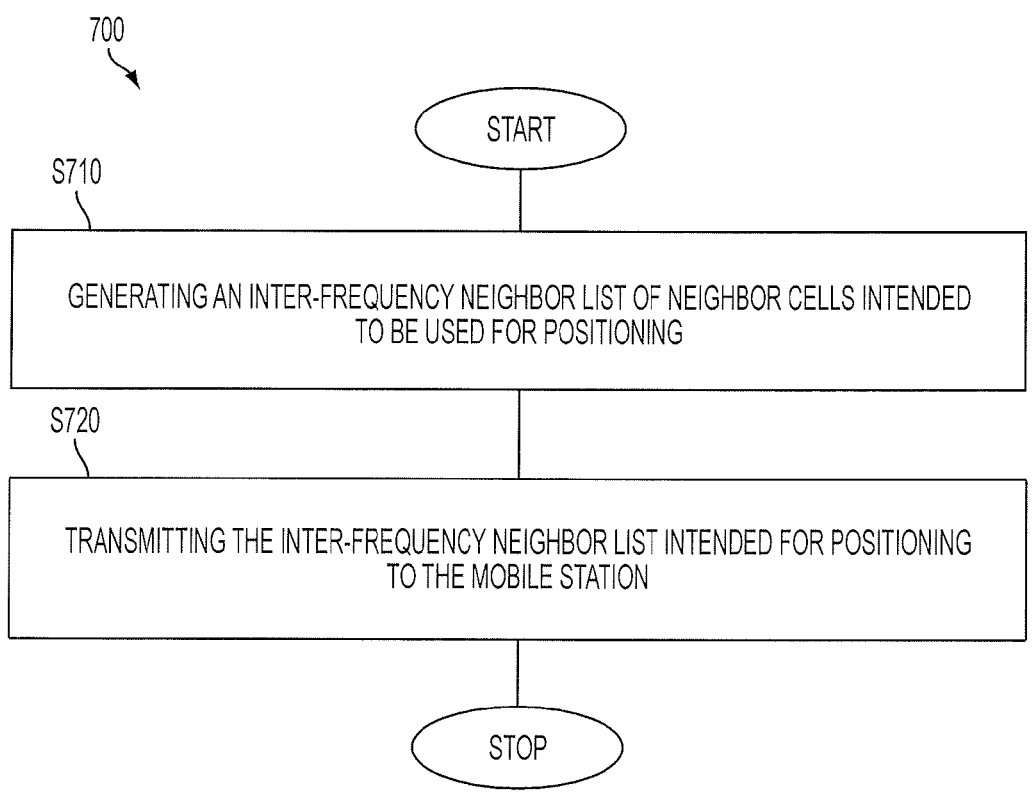
FIG. 7 is a flow chart of a method enabling inter-frequency reference signal difference measurements.

FIG. 7 is a flow chart of a method 700 enabling inter-frequency reference signal difference measurements. The method 700 includes generating (at S710), by a network node for a user equipment, an inter-frequency neighbor list of neighbor cells intended to be measured. The neighbor node may be an eNodeB or a positioning node. Each neighbor cell (202) whose information is included in the inter-frequency neighbor list satisfies an alignment condition and a sufficient measurement time. According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal. The method also includes transmitting (at S720) the inter-frequency neighbor list to the user equipment.

Figure 8:
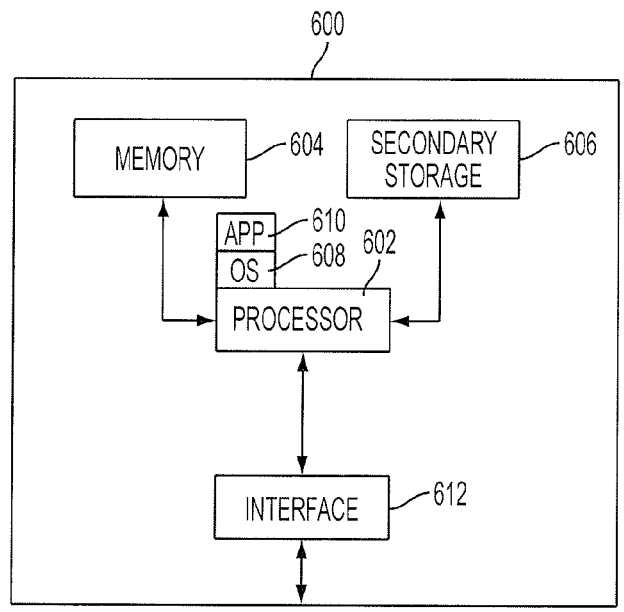
FIG. 8 is a schematic diagram of a user equipment or a base station, according to embodiments.

As described embodiments involve both user equipment (UE) and network side components, e.g., base stations or eNodeBs. The UE 204 and eNodeB 200 of FIG. 1 can, for example, be implemented using various components, both hardware and software. For example, as shown generally in FIG. 8, such a UE or eNodeB 600 can include a processor 602 (or multiple processor cores), memory 604, one or more secondary storage devices 606 (e.g., external storage device(s)), an operating system 608 running on the processor 602 and using the memory 604, as well as a corresponding application 610, e.g., an application which handles timing alignment in the manner described above. An interface unit 612 may be provided to facilitate communications between the node 600 and the rest of the network or may be integrated into the processor 602. For example, interface unit 612 can include a transceiver capable of communicating wirelessly over an air interface, e.g., as specified by LTE, including hardware and software capable of performing the necessary modulating, coding, filtering and the like, as well as demodulating and decoding to process such signals, including inter-frequency measurement commands or data as described above.

Figure 9:
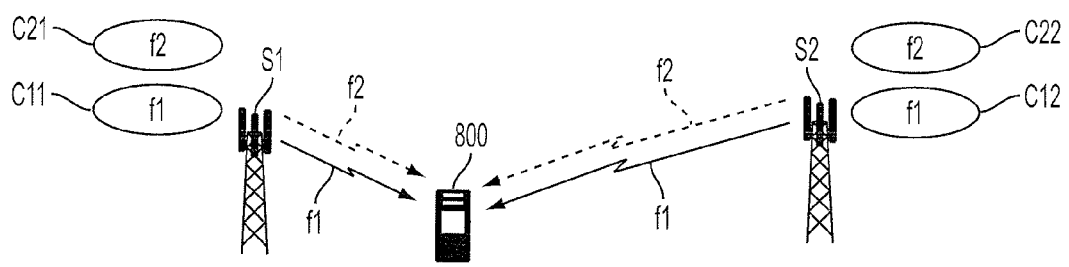
FIG. 9 is an illustration of a system in which cells having different frequencies are co-located.

When cells operating on different frequencies are co-located (i.e. located in the same site and in some cases also in the same base station), such information as the estimated RSTD or search window ideally is likely to be very similar for cells operating on these frequencies (see FIG. 9 wherein co-located cells with assistance information obtained on one frequency can also be reused on the other frequency). The reason is that the co-located cells even in an asynchronous network are time-aligned with the same site or base station. However, due to many factors, e.g. different transmit power, different interference and signal quality levels, the assistance data may be more accurately defined on one of the frequencies than on the others. This suggests that the most accurate assistance information from one set of frequencies can be used for another set of frequencies in the co-located cells.

When the cells operating on different frequencies f1 and f2 are co-located, embodiments utilize the most accurate assistance information available from the two frequencies for building up the assistance data. The choice can be done by the network in the positioning node to decide which assistance data to transmit, but the choice could also be done by the UE if it received the assistance information for cells on different frequencies and it has the antenna location information, i.e. can find out which cells are co-located.

As an example assume f1 is intra-frequency and f2 is inter-frequency, and that the cells on f1 and f2 are co-located. Then the estimated RSTD measurement between cells C11 and C12 performed on f1 can be used for determining the propagation delay (D1) between UE and cell C21 and the propagation delay (D2) between UE 800 and cell C22. The cells C11 and C21 are co-located in site S1 and belong to carrier frequency f1 and f2 respectively. Similarly cells C21 and C22 are co-located in site S2 and belong to carrier frequency f1 and f2, respectively. The estimated propagation delay D1 and D2 in addition to other factors (e.g. misalignment between cells as described above) can be used in determining sufficient time for measuring cell C21 and C22 for doing positioning measurement (i.e. RSTD with a reference cell) in the gaps. Using this information the network can also decide whether to include a cell in the neighbor cell list for positioning measurement or not.

Figure 10:
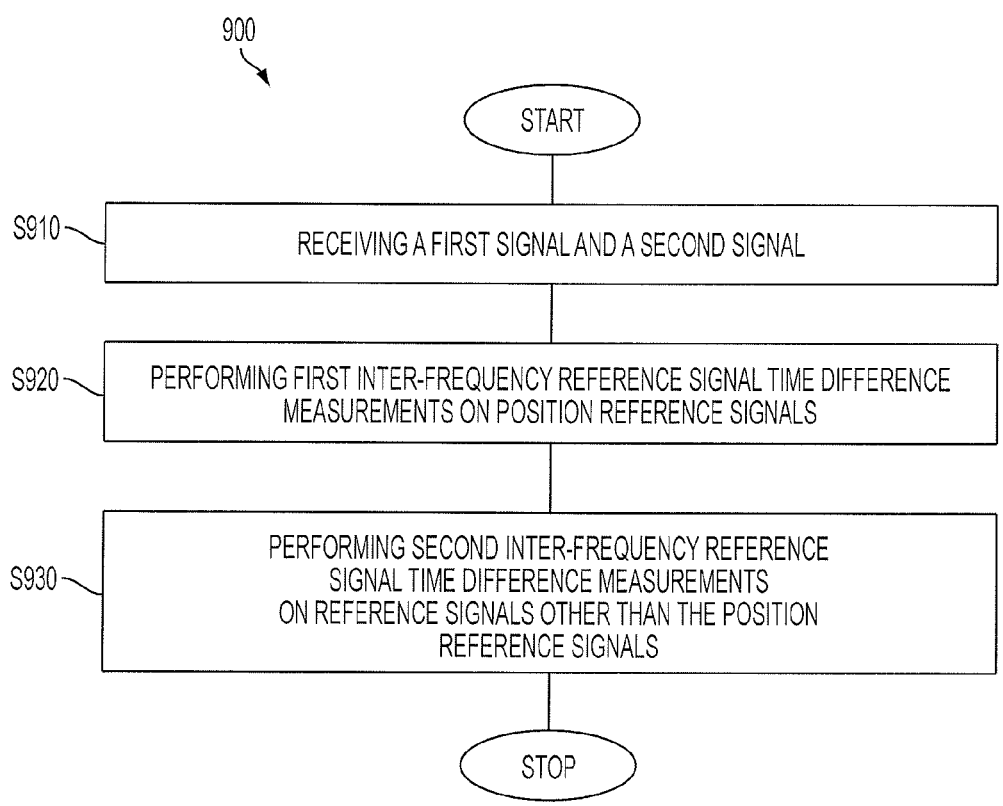
FIG. 10 is a flow diagram of a method of performing inter-frequency reference signal time difference measurements according to an embodiment.

FIG. 10 is a flow diagram of a method 900 of performing inter-frequency reference signal time difference measurements by a user equipment (e.g., 204 in FIG. 1) according to an embodiment. The method includes receiving (at S910) a first signal having a first frequency via a reference cell (e.g., 202A in FIG. 1) associated with the user equipment, and a second signal having a second frequency received via a neighbor cell (202) included in an inter-frequency neighbor list. Note that the reference cell may or may not be the serving cell. The method further includes performing (at S920) first inter-frequency reference signal time difference measurements on position reference signals of the neighbor cell during first measurement gaps that overlap with positioning subframes of the second signal. A neighbor cell is included in the inter-frequency neighbor list if satisfying an alignment condition and a sufficient measurement time.

According to the alignment condition, subframes of a first signal having a first frequency transmitted via a reference cell associated with the user equipment are at least one of (a) synchronized with, (b) have a known offset relative to or (c) have a random offset smaller than one half of a subframe relative to corresponding subframes of a second signal having a second frequency transmitted via the each one of neighboring cells. The sufficient measurement time is determined by an overlap of measurement gaps and positioning subframes in the second signal. The measuring gaps occur more often than the position reference signals.

The method 900 further includes (at S930) performing second inter-frequency reference signal time difference measurements on reference signals other than the position reference signals during second measurement gaps that do not overlap with the positioning subframes in the second signal.

Embodiments are described above for positioning measurements. However the present invention is not limited in its applicability to positioning measurements, but instead applies to all types of neighbor cell measurements, which are done by the UE on signals (e.g. pilot or reference signals), which are relatively sparse, i.e. which are sent by the network) with periodicity longer than that of the measurement gap period. Embodiments can also be applied, for example, when some particular time slots are of interest for some measurements and the time slots are sparsely located in time or at least less frequent than the measurement gap period. For instance embodiments apply to other types of measurements for network planning or for self organizing networks.

Embodiments have, among others, at least the following advantages including enabling inter-frequency positioning measurements, enabling inter-frequency measurements on signals sparsely transmitted in time or during specific subframes sparsely located in time, and improved quality and reliability of the assistance data transmitted by the network as well as avoiding unnecessary positioning signaling overhead by excluding cells for which inter-frequency measurements of sufficient quality cannot be expected.

According to one embodiment, a method in the positioning node or BS ensures that specific measurements within specific time slots can be conducted within configured measurement gaps, where either the transmitted signals on which the measurements are to be performed on or the time slots appear sparsely in time or at least less frequency than the measurement gap period. Embodiments are applicable both to user plane and control plane positioning.

According to another embodiment, a method involves using the time alignment information when building up the assistance data signaled to the UE, where the information may also be jointly considered together with the positioning configuration information (e.g., PRS transmission bandwidth, environment type and PRS periodicity), UE positioning accuracy requirements, etc. According to another embodiment, positioning-originated triggering of configuration/reconfiguration of inter-frequency measurement gaps is enabled. Moreover, embodiments are not limited to timing measurements, PRS or positioning in general, but are also applicable in general for inter-frequency measurements on signals sparsely transmitted in time, i.e. a special type of signals (e.g. PRS), signals which can be transmitted more often but transmitted instead according to a more sparse pattern in time, for example, for the energy saving reasons or interference coordination, and/or during low-interference subframes sparsely located in time (e.g., positioning subframes, MBSFN subframes, etc.), estimated RSTD and uncertainty are used to schedule inter-frequency measurement gaps.

Based on the foregoing, it will be appreciated that embodiments ensure that positioning subframes are aligned within a subframe both in synchronous and asynchronous networks, for intra- and inter-frequency measurements. Moreover, for those measurements which use PRS signals, e.g., on frequency f2, a maximum effective PRS measurement time within one positioning occasion is 4 full subframes according to an embodiment. These features enable some embodiments to perform inter-frequency measurements with no extra signaling.

Figure 11:
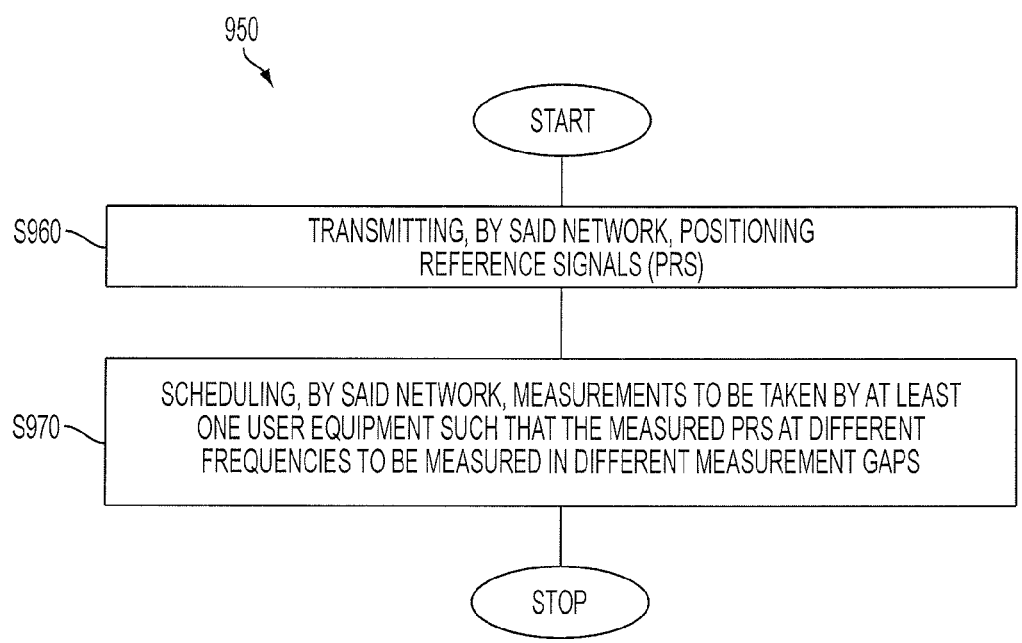
FIG. 11 is a flow diagram of a method for performing measurements in a radio communication network.

According to another embodiment illustrated in FIG. 11, a method for performing measurements in a radio communication network 950 includes transmitting, by said network, positioning reference signals (PRS) at S960. Further the method includes scheduling, by said network, measurements to be taken by at least one user equipment such that the measured PRS at different frequencies to be measured in different measurement gaps, at S970.

The foregoing description of exemplary embodiments provides illustration and description, but it is not intended to be exhaustive or to limit the invention to the precise form disclosed. Modifications and variations are possible in light of the above teachings or may be acquired from practice of the invention.

What is claimed is:

1. A method of enabling inter-frequency reference signal time difference measurements on reference signals, comprising:
generating, by a network node for a network device and wherein the network node is an eNodeB or an E-SMLC, an interfrequency neighbor list of neighbor cells intended to be measured, each neighbor cell whose information is included in the inter-frequency neighbor list satisfying,
an alignment condition according to which subframes of a first signal having a first frequency transmitted via a reference cell are at least one of (a) synchronized with, (b) have a known offset relative to or (c) have a random offset smaller than one half of a subframe relative to corresponding subframes of a second signal having a second frequency transmitted via the each neighbor cell, and
a measurement time which is determined by an overlap of measurement gaps and positioning subframes in the second signal, and
transmitting the inter-frequency neighbor list to the user equipment.

2. The method of claim 1, wherein the first frequency is different from a frequency of the serving cell.

3. The method of claim 2, wherein the first frequency is the same as the second frequency.

4. The method of claim 1, further comprising:
configuring, by the network node, the measurement gaps to satisfy the sufficient measurement time for a neighbor cell for which the alignment condition is satisfied.

5. The method of claim 4, wherein the network node performs the configuring of the measurement gaps upon detecting a new neighbor cell for which the alignment condition is satisfied or upon receiving an instruction.

6. The method of claim 1, wherein the sufficient measurement time cannot exceed 5 positioning subframes of the second signal overlapping with a respective measurement gap.

7. The method of claim 1, further comprising:
configuring, by the network node, the measurement gaps to capture positioning subframes of different second signals received via different neighbor cells, in different measurement gaps.

8. The method of claim 4, wherein the network node configures the measurement gaps to occur at a time shift relative to an estimated time of a beginning of a first positioning subframe in the second signal relative to the reference cell, by subtracting a switching time necessary to the user equipment to switch from the first frequency to the second frequency, and by adding an uncertainty in timing when the estimated time is larger than zero or subtracting the uncertainty when the estimated time is smaller than zero.

9. The method of claim 1, further comprising:
reconfiguring, by the network node, the measurement gaps to satisfy the sufficient measurement time for a neighbor cell that satisfies the alignment condition, if the measurement gaps have been configured before the generating and the sufficient measurement time is not satisfied for the neighbor cell.

10. The method of claim 1, wherein the sufficient measurement time is determined based on (a) a requested position accuracy to be achieved, (b) an estimated signal quality, (c) position reference signal bandwidth, (d) periodicity of position reference signal occasions, or (e) a number of consecutive downlink subframes in a position reference signal occasion.

11. The method of claim 1, wherein the network node selects one cells among two or more neighbor cells having a same location and different second frequencies, based on information on the two or more neighbor cells that indicates that the second signal received by the user equipment via the one cell has a signal quality better than a signal quality of the second signals received via the two or more neighbor cells, and includes only the one cell among the two or more neighbor cells having a same location in the inter-frequency neighbor list.

12. A network node, wherein the network node is an eNodeB or an E-SMLC, comprising:
a transceiver including an interface configured to communicate with a user equipment via cells;
a processor connected to the interface, wherein the processor controls the interface to transmit towards the user equipment via a reference cell, an interfrequency neighbor list which includes information about neighbor cells, each one of said neighbor cells in said list satisfying,
an alignment condition according to which subframes of a first signal having a first frequency transmitted via the reference cell associated with the user equipment are at least one of (a) synchronized with, (b) have a known offset relative to, or (c) have a random offset smaller than one half of a subframe relative to corresponding subframes of a second signal having a second frequency transmitted via the each one of the neighboring cells, and
a measurement time which is determined by an overlap of measurement gaps and positioning subframes in the second signal.

13. The network node of claim 12, wherein the processor configures the measurement gaps to satisfy the sufficient measurement time for a neighbor cell for which the alignment condition is satisfied.

14. The network node of claim 13, wherein the processor configures the measurement gaps upon detecting a new neighbor cell for which the alignment condition is satisfied.

15. The network node of claim 13, wherein the processor configures the measurement gaps upon receiving an instruction.

16. The network node of claim 13, wherein the processor configures the measurement gaps to capture positioning subframes of different second signals received via different neighbor cells, in different measurement gaps.

17. The network node of claim 13, wherein the processor configures the measurement gaps to occur at a time shift relative to an estimated time of a beginning of a first positioning subframe in the second signal relative to the reference cell, by subtracting a switching time necessary to the user equipment to switch from the first frequency to the second frequency, and by adding an uncertainty when the estimated time is larger than zero or by subtracting the uncertainty when the estimated time is smaller than zero.

18. The network node of claim 12, wherein the processor reconfigures the measurement gaps to satisfy the sufficient measurement time for a neighbor cell satisfying the alignment condition, if the measurement gaps have been configured before the generating, and the sufficient measurement time is not satisfied for the neighbor cell.

19. The network node of claim 12, wherein the processor determines the overlap to enable achieving a predetermined position accuracy.

20. The network node of claim 12, wherein the processor determines the overlap depending on positions of the reference cell and the neighboring cells relative to the user equipment.

21. The network node of claim 12, wherein the processor determines the overlap depending on an estimated signal quality.

22. The network node of claim 12, wherein the processor selects one cell among two or more neighbor cells having a same location and different second frequencies, based on information on the two or more neighbor cells that indicates that the second signal received by the user equipment via the one cell has a signal quality better than a signal quality of the second signals transmitted via the two or more neighbor cells, and includes only the one cell among the two or more neighbor cells having the same location in the inter-frequency neighbor list of neighbor cells.

23. A method of performing inter-frequency reference signal time difference measurements by a user equipment, comprising:
receiving a first signal having a first frequency via a reference cell associated with the user equipment, and a second signal having a second frequency received via a neighbor cell included in an inter-frequency neighbor list; and
performing first inter-frequency reference signal time difference measurements on position reference signals of said neighbor cell during first measurement gaps that overlap with positioning subframes of the second signal,
wherein the neighbor cell is included in the inter-frequency neighbor list if satisfying,
an alignment condition according to which subframes of the first signal are (a) synchronized with, (b) have a known offset relative to or (c) have a random offset smaller than one half of a subframe relative to corresponding subframes of the second signal, and
a measurement time which is determined by an overlap of the first measurement gaps with positioning subframes of the second signal wherein measuring gaps occur more often than the position reference signals.

24. The method of claim 23, further comprising:
performing second inter-frequency reference signal time difference measurements on reference signals other than the position reference signals during second measurement gaps that do not overlap with the positioning subframes in the second signal.

25. A user equipment, comprising:
a transceiver including an interface configured to receive a first signal having a first frequency via a reference cell and a second signal having a second frequency received via a neighbor cell included in an inter-frequency neighbor list provided by a network node; and
a processor connected to the interface and configured to perform first inter-frequency reference signal time difference measurements on position reference signals, during first measurement gaps that overlap with positioning subframes of the second signal,
wherein the neighbor cell is included in the inter-frequency neighbor list if satisfying an alignment condition according to which subframes of the first signal are (a) synchronized with, (b) have a known offset relative to or (c) have a random offset smaller than one half of a subframe relative to corresponding subframes of the second signal, and
a measurement time which is determined by an overlap of the first measurement gaps with positioning subframes of the second signal, and wherein measuring gaps occur more often than the position reference signals.

26. The user equipment of claim 25, wherein the processor is further configured to perform second inter-frequency reference signal time difference measurements on reference signals other than the position reference signals, during second measurement gaps that do not overlap with the positioning subframes in the second signal.

27. A method of performing measurements by a user equipment, which receives a first signal having a first frequency via a reference cell, and second signals having respective second frequencies via neighbor cells, comprising:
performing inter-frequency reference signal time difference measurements on first reference signals which are transmitted more frequently than second reference signals, during measurement gaps, when subframes of the first signal and corresponding subframes of the second signal are not synchronized.

28. The method of claim 27, wherein the inter-frequency reference signal time difference measurements are used to determine a position of the user equipment.

29. The method of claim 27, wherein the first reference signals are cell reference signals (CRS) and the second reference signals are position reference signals.

30. The method of claim 27, wherein the first frequency is equal to the second frequency.

31. A user equipment, comprising:
a transceiver including an interface configured to receive a first signal having a first frequency, via a reference cell and second signals having respective second frequencies, via neighbor cells; and
a processor connected to the interface and configured to perform inter-frequency reference signal time difference measurements on first signals which are transmitted more frequently than second reference signals, when subframes in the first signal and corresponding subframes of the second signal are not synchronized.

32. The user equipment of claim 31, wherein the inter-frequency reference signal time difference measurements are used to determine a position of the user equipment.

33. The user equipment of claim 31, wherein the first reference signals are cell reference signals (CRS), and the second reference signals are position reference signals.

* * * * *